United States Patent
Kahle (10) Patent No.: US 8,700,202 B2
(45) Date of Patent: Apr. 15, 2014

(54) SYSTEM FOR POSITIONING A TOOL IN A WORK SPACE

(75) Inventor: Kent Kahle, Dayton, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 283 days.

(21) Appl. No.: 12/956,536

(22) Filed: Nov. 30, 2010

(65) Prior Publication Data

US 2012/0136475 A1    May 31, 2012

(51) Int. Cl.
| | |
|---|---|
| *G06F 19/00* | (2011.01) |
| *G06F 7/70* | (2006.01) |
| *G06G 7/00* | (2006.01) |
| *G06G 7/76* | (2006.01) |
| *G01S 1/00* | (2006.01) |
| *G05D 1/02* | (2006.01) |
| *G01S 3/02* | (2006.01) |

(52) U.S. Cl.
USPC ............ 700/182; 701/50; 701/408; 701/484; 701/485; 701/492; 37/348; 342/450; 342/463

(58) Field of Classification Search
USPC ............ 700/182; 701/50, 408, 484, 485, 492; 342/450, 463; 37/348
See application file for complete search history.

(56) References Cited

U.S. PATENT DOCUMENTS

| | | |
|---|---|---|
| 5,299,130 A | 3/1994 | Ono |
| 5,510,800 A | 4/1996 | McEwan |
| 5,661,490 A | 8/1997 | McEwan |
| 5,663,734 A | 9/1997 | Krasner |
| 5,748,147 A | 5/1998 | Bickley et al. |
| 5,901,172 A | 5/1999 | Fontana et al. |
| 5,960,413 A | 9/1999 | Amon et al. |
| 6,054,950 A | 4/2000 | Fontana |
| 6,195,922 B1 * | 3/2001 | Stump ............................. 37/348 |

(Continued)

FOREIGN PATENT DOCUMENTS

| | | |
|---|---|---|
| CN | 101133216 A1 | 2/2008 |
| DE | 19901334 A1 | 10/2000 |

(Continued)

OTHER PUBLICATIONS

Behzadan et al., Ubiquitous location tracking for context-specific information delivery on construction sites, Feb. 11 2008, Automation in Construction 17 (2008), pp. 737-748.*

(Continued)

*Primary Examiner* — Kavita Padmanabhan
*Assistant Examiner* — Jason Lin
(74) *Attorney, Agent, or Firm* — Dinsmore & Shohl LLP (57) ABSTRACT

A system for assisting in the use by an operator of the operating element of a tool at desired locations at a worksite, includes a stationary control and a position sensor secured to the tool. The stationary control is located at the worksite, and has data stored therein specifying one or more desired locations for operation of the operating element of the tool at the worksite. A position sensor is mounted on the tool. The position sensor determines the position of the operating element of the tool. The position sensor includes a communication device for communicating with said stationary control, a sensor for determining its relative position with respect to said stationary control, and a display for providing indications to the user of the tool of the desired location for the operating element of the tool and of the actual location of the operating element of the tool.

16 Claims, 8 Drawing Sheets

(56) References Cited

U.S. PATENT DOCUMENTS

| | | | |
|---|---|---|---|
| 6,812,884 | B2 | 11/2004 | Richley et al. |
| 6,832,175 | B2 * | 12/2004 | Adachi et al. .................. 702/177 |
| 6,882,315 | B2 | 4/2005 | Richley et al. |
| 6,963,301 | B2 | 11/2005 | Schantz et al. |
| 7,168,174 | B2 | 1/2007 | Piekutowski |
| 2002/0049531 | A1 * | 4/2002 | Tanaka et al. .................. 701/207 |
| 2002/0154294 | A1 | 10/2002 | Hedges et al. |
| 2004/0107072 | A1 | 6/2004 | Dietrich et al. |
| 2005/0187731 | A1 * | 8/2005 | Ericsson et al. ................. 702/92 |
| 2006/0090379 | A1 * | 5/2006 | Furem ............................ 37/443 |
| 2006/0123673 | A1 * | 6/2006 | Glover ............................ 37/348 |
| 2007/0107240 | A1 * | 5/2007 | Piekutowski ................... 33/286 |
| 2007/0293153 | A1 | 12/2007 | Molisch et al. |
| 2008/0001755 | A1 * | 1/2008 | Puzio et al. .................. 340/572.1 |
| 2008/0047170 | A1 * | 2/2008 | Nichols ........................... 37/348 |
| 2009/0162177 | A1 | 6/2009 | Nichols |
| 2009/0192644 | A1 * | 7/2009 | Meyer et al. .................. 700/109 |
| 2009/0259373 | A1 * | 10/2009 | Nichols et al. .................. 701/50 |
| 2009/0281419 | A1 * | 11/2009 | Troesken et al. ............. 600/424 |
| 2010/0123892 | A1 * | 5/2010 | Miller et al. ................. 356/4.01 |

FOREIGN PATENT DOCUMENTS

| | | | |
|---|---|---|---|
| DE | 102006029122 | A1 | 6/2006 |
| DE | 10 2006 034 270 | A1 | 1/2008 |
| DE | 102006034270 | A1 | 1/2008 |
| DE | 112006003390 | T5 | 10/2008 |
| DE | 102008059365 | A1 | 6/2010 |

OTHER PUBLICATIONS

Goodrum et al., The application of active radio frequency identification technology for tool tracking on construction job sites, May 17, 2005, Elsevier, Automation in Construction (2006), pp. 292-302.*

Fontana et al., "A Programmable Ultra Wideband Signal Generator for Electromagnetic Susceptibility Testing", IEEE Conference on Ultra Wideband Systems and Technologies, Nov. 2003, Reston, VA.

Fontana et al., "Commercialization of an Ultra Wideband Precision Asset Location System", IEEE Conference on Ultra Wideband Systems and Technologies, Nov. 2003, Reston, VA.

Fontana, "Current Trends in UWB Systems in the USA, Implementation, Applications and Regulatory Issues", Multispectral Solutions, Inc., Advanced Ratio Technology Symposium, 2002, Tokyo, Japan.

Fontana, "On 'Range-Bandwidth per Joule' for Ultra Wideband and Spread Spectrum Waveforms", Multispectral Solutions, Inc., Mar. 20, 1998.

Bennett et al., "Time-Domain Electromagnetics and Its Applications", Proceedings of the IEEE, vol. 66, No. 3, Mar. 1978.

Fontana et al., "Recent Advances in Ultra Wideband Radar and Ranging Systems", 2007 IEEE International Conference on Ultra-Wideband (ICUWB), Singapore, Sep. 24-26, 2007.

Fontana, "Recent System Applications of Short-Pulse Ultra-Wideband (UWB) Technology", IEEE Microwave Theory and Tech., vol. 52, No. 9, Sep. 2004.

Fontana et al., "Ultra-Wideband Precision Asset Location", 2002 IEEE Conference on Ultra Wideband Systems and Technologies, May 2002, Baltimore, MD.

Fontana et al., "Ultra Wideband Technology for Aircraft Wireless Intercommunications Systems (AWICS) Design", 2003 IEEE Conference on Ultra Wideband Systems and Technologies, Nov. 2003, Reston, VA.

Office Action dated Mar. 19, 2012 pertaining to German Application No. 10 2010 037 739.2.

Office Action dated Oct. 24, 2012 pertaining to Chinese Application No. 201010586093.2.

Office Action dated Mar. 8, 2013 pertaining to Chinese Application No. 201010586093.2.

German Office Action dated May 6, 2013 (English Translation), German Patent Application No. 10 2011 053 381.8, System for Positioning a Tool in a Work Space, Trimble Navigation Limited.

"Survey of Wireless Indoor Positioning Techniques and Systems", Hui Liu et al., Systems, Man, and Cybernetics, Part C: Applications and Reviews, IEEE Transactions on, vol. 37, No. 6, pp. 1067,1080, Nov. 2007, doi: 10.1109/TSMCC.2007.905750.

Chinese Office Action dated Jun. 18, 2013, pertaining to Chinese Patent Application No. 201110378217.7.

Chinese Office Action dated Nov. 29, 2013, pertaining to Chinese Patent Application No. 201110378217.7.

* cited by examiner

SYSTEM FOR POSITIONING A TOOL IN A WORK SPACE

CROSS-REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

This relates to a system that facilitates positioning a tool in a work space or at a work site, such as for example a construction site. When the interior of a building is being finished, connectors, anchors and the like are attached to the floors, ceilings and other structures in the building and cuts are made and holes drilled using power saws and drills. All of this must be accomplished using special power tools at predetermined locations, requiring that the tools be operated at numerous precisely defined positions in the building. For example, nail guns, power saws, powder anchor tools, and the like are used to nail, cut, install fasteners, and perform other operations at predetermined points within the building with little error. In any building, a large number of electrical, plumbing, and HVAC components must be properly sited and installed, usually with power tools. Additionally, finishing a building interior also requires that a number of different tools that are not powered be operated at precisely defined positions, such as for example reinforcement bar scanners. Positioning both power tools and non-power tools must be accomplished quickly and with some precision with respect to the surrounding walls, ceilings and floors as they are roughed in. Typically, it has required a significant amount of labor to lay out various construction points at such a construction site. Teams of workers have been needed to measure and mark predetermined locations. It will be appreciated that this process has been subject to errors, resulting from measurement mistakes and from accumulated errors. Further, the cost of this layout process and the time needed to perform the layout process have both been significant.

Ranging radios offer an excellent alternative to GPS receivers for positioning applications where GPS reception is not available, such as inside a building, or where use of GPS receivers is not reliable. For example, GPS receivers require line-of-sight access to multiple satellites in order to function properly. Use of GPS receivers may not be possible in some operational settings, such as when work is being performed indoors, underground, or in cluttered environments.

Ranging radios, operating at ultra wideband (UWB) frequencies, provide very accurate measurement of distances between the radios, using time-of-flight analysis. When ranging is accomplished from multiple fixed position radios to a target radio, the relative, three-dimensional position of the target radio is accomplished through trilateration. To perform a range measurement, an originating ranging radio transmits a packet consisting of a synchronization preamble and a header. The header contains the range command with the address of the destination radio that is requested to respond to the packet. The originating radio resets its main counter at the time of this transmission, establishing a local time-zero reference. When the destination ranging radio receives the range request addressed to it, it records the time of receipt, and replies with its own packet, including the time of receipt and the time of the responding transmission in the header. The originating radio receives the ranging packet back from the destination radio, records its time of receipt and latches its main counter. The range value is then calculated and recorded, utilizing the time information to compensate for the differences in the timing clocks at the two radios.

Other location determination systems have been used in the past for building layout including, for example, robotic total stations. The total station is positioned at a fixed, known location and directs a beam of laser light at a retroreflective target. As the target moves, robotics in the total station redirect the beam of light so that it tracks the target. By measuring the time of travel of the beam from the total station to the retroreflective target and then back to the total station, the distance to the target is determined. The directional orientation of the beam to the target is also measured. Since the dimensional coordinates of the total station are known, the dimensional coordinates of the retroreflective target can easily be determined.

Although position determination systems, such as ranging radio systems and robotic total station systems, can facilitate and speed the layout process, nevertheless the layout process has continued to be lengthy, tedious, and expensive.

SUMMARY

A system for assisting an operator of a tool in positioning the operating element of the tool at desired locations at a worksite, includes a stationary control and a position sensor. The stationary control is located at the worksite and has data stored therein specifying one or more desired locations for operation of the operating element of the tool at the worksite. The position sensor is mounted on the tool for determining the position of the operating element of the tool. The position sensor includes a communication device, a sensor, and a display. The communication device communicates with the stationary control. The sensor determines its relative position with respect to the stationary control. The display provides indications to the user of the tool of the desired location for the operating element of the tool and of the actual location of the operating element of the tool.

The position sensor may further include a calculator for determining the position of the operating element of the tool based on the position of the sensor relative to the stationary control. Alternatively, the stationary control may include a calculator for determining the position of the operating element of the tool based on the position of the sensor relative to the stationary control. The desired locations may be specified in three dimensions, or they may be specified in two dimensions. The position sensor may comprise a ranging radio attached to the tool. The sensor may comprise an RFID circuit. The sensor may comprise a retroreflective element. The tool may be a power tool or a non-power tool.

A system for determining the dimensional coordinates of an operating element of a tool in a work space and for guiding the operator of the tool in moving the operating element to desired location, may comprise a plurality of fixed position ranging radios located at known positions in the work space, a pair of ranging radios mounted on the tool, a first ranging radio spaced from the operating element by a first distance, and a second ranging radio spaced from the first ranging radio by a second distance, a measurement circuit, responsive to the pair of ranging radios, for determining the position of each of the pair of ranging radios with respect to the plurality of fixed position ranging radios, and for determining the position of the operating element of the tool with respect to the plurality of fixed position ranging radios, and a display for providing indications to the user of the tool of the location for the operating element of the tool with respect to a desired location, whereby movement of the operating element to the desired location is facilitated. The tool may be a power tool or a non-power tool.

The first and second distances may be substantially equal. The plurality of fixed position ranging radios may comprise at least four ranging radios. The measurement circuit may be responsive to a user input to permit the user to specify a desired position for the operating element of the tool. The system further comprises a display, responsive to the measurement circuit, for indicating the movement of the operating element needed to move it to the desired position. The system may comprise at least one additional ranging radio mounted on the tool. The one additional ranging radio is spaced circumferentially around the tool with respect to the pair of ranging radios.

A system determines the dimensional coordinates of an operating element of a tool in a work space and indicates to the user of the tool that the operating element of the tool is properly positioned for operation. A stationary control for measuring the positions of reference elements in the work space includes a tool having an operating element, and at least one reference element, mounted on the tool in known spatial relation to the operating element. A measurement device is responsive to the reference element for determining the position of the operating element of the tool in the work space. A display, mounted on the tool, indicates to the operator that the operating element is properly positioned for operation of the tool. The tool may be a power tool or a non-power tool.

The reference element may comprise at least one ranging radio. Alternatively, the reference element may comprise at least one radio frequency identification circuit. Alternatively, the reference element may comprise at least one retroreflective element. Alternatively, the measurement device may comprise a robotic total station. The display for indicating that the operating element is properly positioned for operation of the tool may comprise a display, responsive to the measurement circuit, for indicating to a user the location of the operating element of the tool. The display may comprise a light which is turned on when the tool is positioned at a point for operation. The measurement device may be responsive to a user input to permit the user to specify a desired position for the operating element.

The at least one reference element may comprise a pair of auto-reflective elements mounted on the tool in known spatial relationship to the operating element. The robotic total station then dithers between the pair of auto-reflective elements so as to determine the position of the operating element of the tool.

DETAILED DESCRIPTION OF THE PREFERRED EMBODIMENTS

Figure 1:
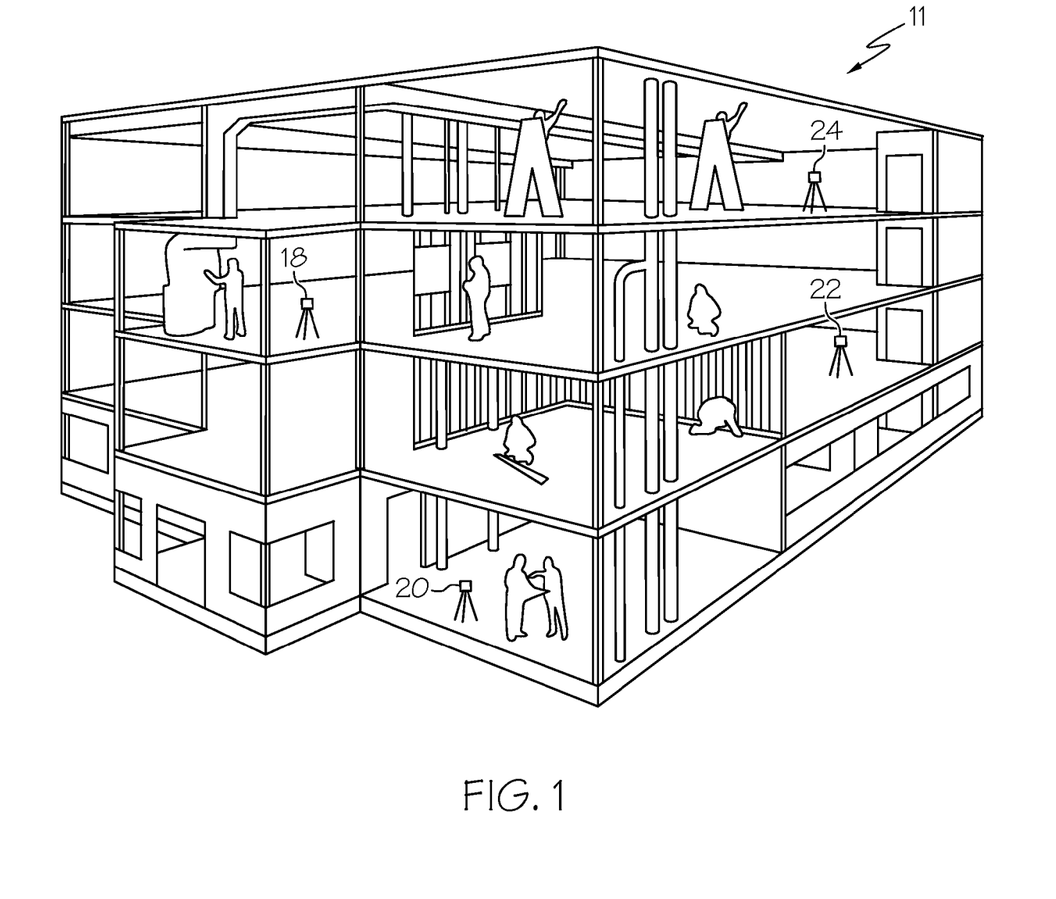
FIG. 1 is a view illustrating a building under construction.

FIG. 1 shows a building 11 under construction, a typical environment in which a system for assisting a tool operator in properly positioning the tool is needed. Power tools are used to install fasteners, nails, and similar devices, and to cut various structural components, such as the floors, walls, and ceilings of the building. Non-power tools are also used to perform numerous functions, such as for example a ferrous scanner can detect the positions of reinforcing bars and studs. In the past it has been necessary for workers to go through a time-consuming layout process, measuring and marking various points where tools, such as power tools, are to be operated, before the cutting, fastening and steps are performed. The embodiments described, below, eliminate the layout step so that a tool can simply be moved directly to the location where it is to be used, and the operator can be signaled that the tool is properly located for operation or use.

Figure 2:
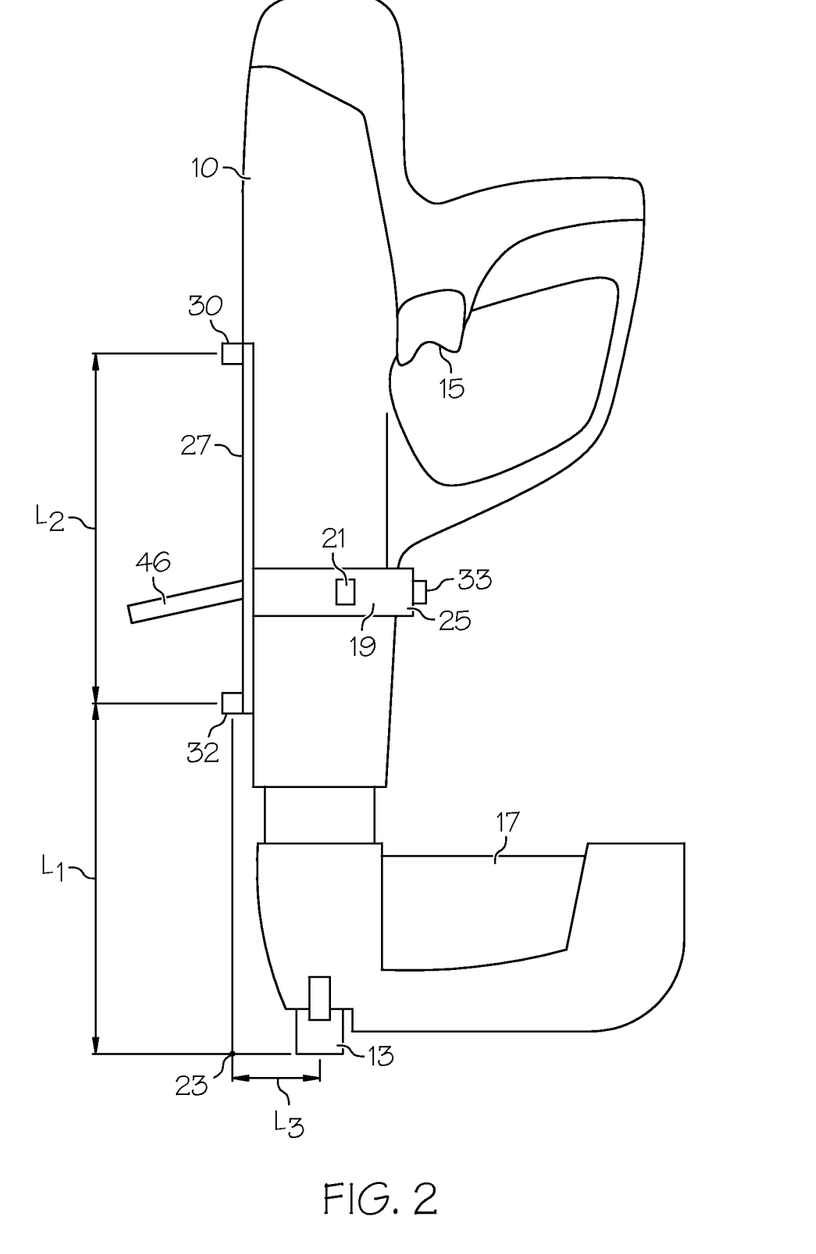
FIG. 2 shows a power tool with three ranging radios mounted on the tool.
Figure 3:
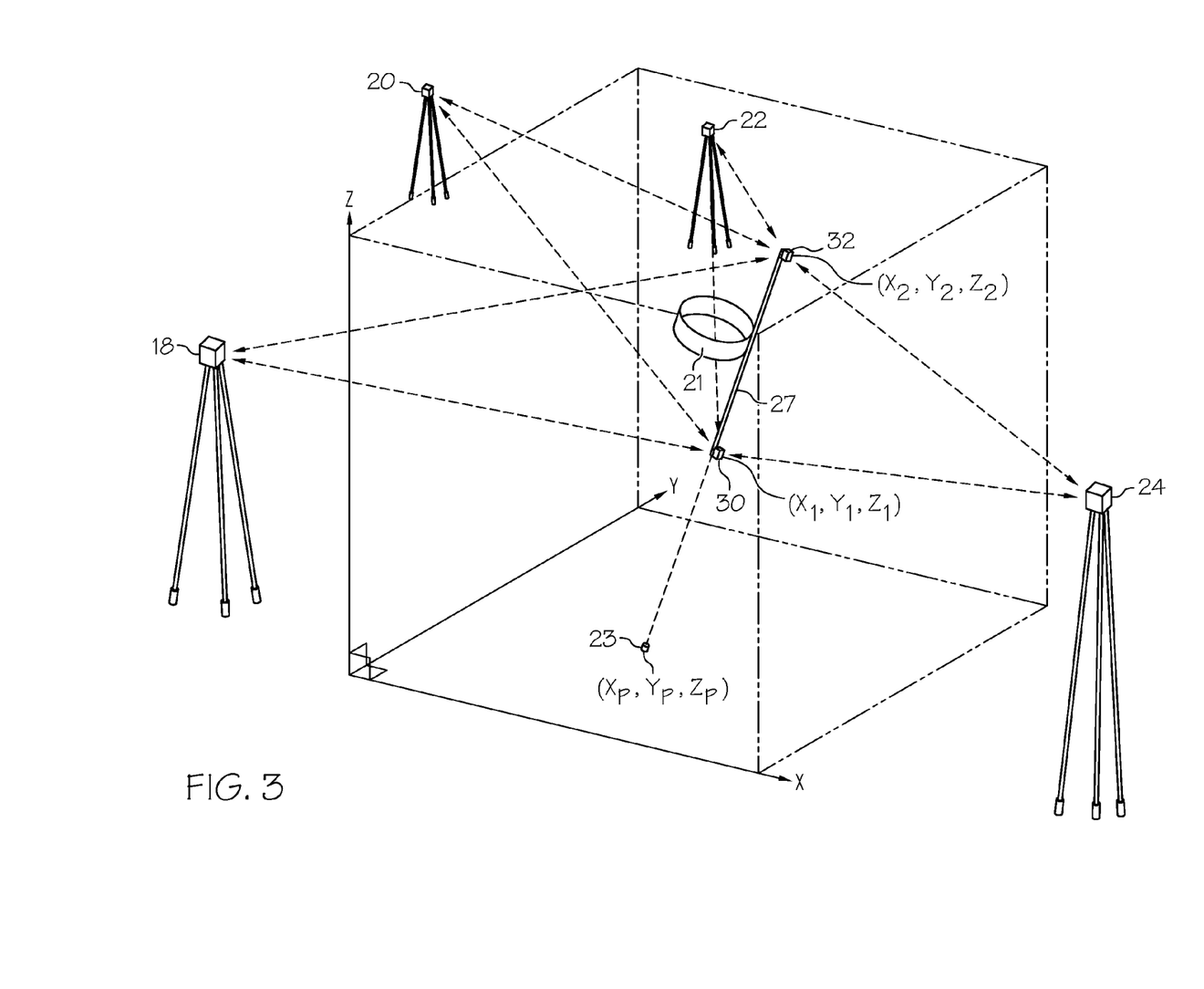
FIG. 3 illustrates the manner in which two of the ranging radios of FIG. 2 are used with four fixed-position ranging radios to determine the dimensional co-ordinates of a point adjacent the operating element of the power tool.
Figure 4:
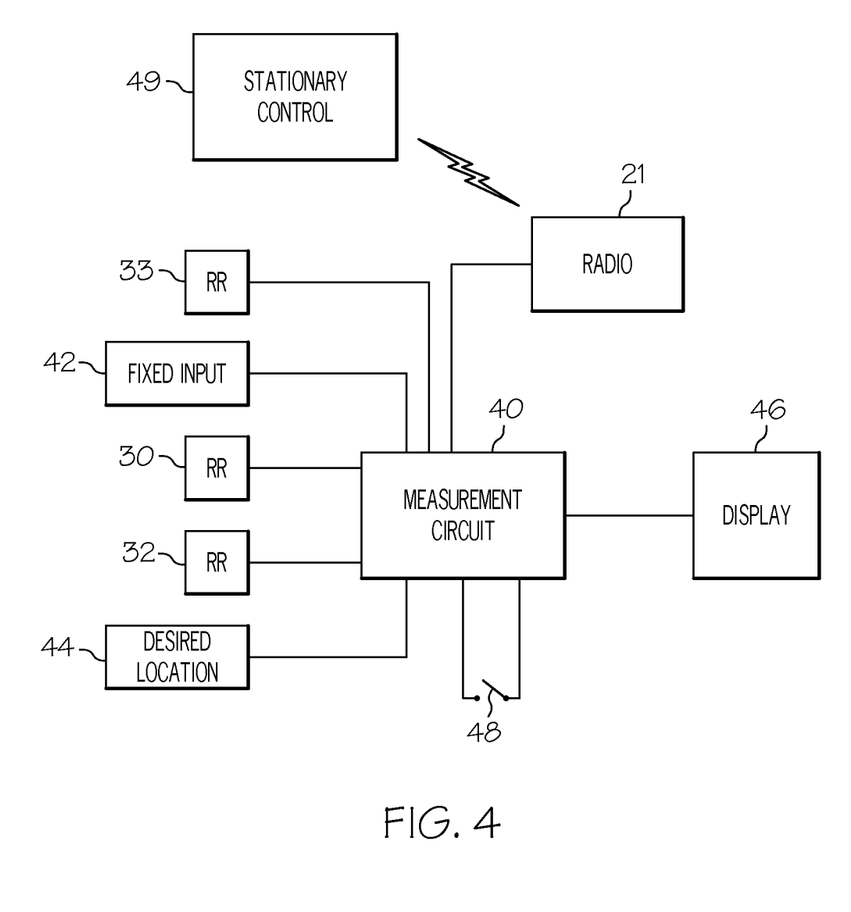
FIG. 4 is a schematic diagram of circuitry used in the system.

FIGS. 2-4 collectively illustrate a first embodiment of the system for assisting an operator in using a tool at desired locations at a worksite. The system includes a tool 10, which is illustrated in FIG. 2 as a power fastener tool. It will be appreciated, however, that the system may be used with non-power tools, as well. The tool 10 has a barrel 13 from which a fastener is fired when the operator presses trigger 15. A supply of fasteners is provided in canister 17. The system includes a position sensor 19 that is mounted on the tool 10 for determining the position of the operating element 13 of the tool. The position sensor 19 includes a communication 21 device for communicating with a stationary control. The stationary control includes ranging radios 18, 20, 22, and 24 (FIG. 3).

The position sensor 19 includes a sensor for determining its relative position with respect to the stationary control. In the embodiment shown, the sensor 19 includes ranging radios 30, 32, and 33. All of the ranging radios are held on the tool 10 with a band 25 that extends around tool 10 and that is attached to plate 27. As will be explained more completely below, the sensors 30 and 32 are arranged to determine the position of the point 23 aligned with ranging radios 30 and 32. Point 23 is aligned with ranging radios 30 and 32 and offset from the operating element 13 of the power tool 10 by a distance $L_3$ in the direction of the ranging radio 33. The first ranging radio 30 is spaced from the point 23 by a first distance $L_1$, and a second ranging radio 32 is spaced from the first ranging radio 30 by a second distance $L_2$. The position sensor 19 further includes a display 46 for providing indications to the user of the tool 10 of the desired location for the operating element 13 and of the actual location of the operating element 13 of the tool 10. It should be appreciated that some tools will permit the locations of the sensors 30 and 32 to be precisely aligned with the operating element 13 of the tool, thus eliminating the need for the ranging radio 33 since the point 23 and the operating element 13 will be coincident.

As indicated, the position sensor 19 determines the coordinates of a point of interest 23 based on the locations that are measured for the ranging radios 30 and 32. The system further includes a plurality of fixed position ranging radios 18, 20, 22 and 24, which are located at known positions at the work space. These positions can be determined through any known surveying or measurement technique, and as shown in FIG. 1, may be located on different floors of the building. Since the point of interest locations throughout the work space are determined from trilateration calculations with respect to the fixed position ranging radios, it is preferable that these fixed position ranging radios be widely dispersed at the work space to optimize accuracy.

Trilateration is a method for determining the intersections of four spherical surfaces, given the locations of the centers and the length of the four spheres. In the present case, the locations of the fixed position ranging radios define the centers of four spheres, and the distance from each ranging radio to a movable ranging radio defines the radius of each sphere. When the distance from a fixed ranging radio to a point of interest is known, the point of interest will necessarily lie somewhere on a spherical surface having a center at the ranging radio, and having a radius equal to the distance. If such distances are determined with respect to all four of the ranging radios, the spherical surfaces that are defined will intersect at the point of interest. Accurate position determination for each of the fixed position ranging radios 18, 20, 22 and 24 is therefore important for accurate operation of the system.

FIG. 3 shows a simplified depiction of the position sensor 19 with only ranging radios 30 and 32, and with a display. As shown in FIG. 3, the coordinates of ranging radio 30 are $X_1$, $Y_1$, and $Z_1$, the coordinates of ranging radio 32 are $X_2, Y_2$, and $Z_2$, and the coordinates of point 23 are $X_P$, $Y_P$, and $Z_P$. Ranging radios 30 and 32 lie on a common line with point 23, as indicated by the dashed line. It will be apparent from a review of FIG. 3, that $$(X_2-X_1)/L_2=(X_1-X_P)/L_1$$

and $$X_P=X_1+(L_1/L_2)(X_1-X_2).$$

Similarly, $$Y_P=Y_1+(L_1/L_2)(Y_1-Y_2),$$

and $$Z_P=Z_1+(L_1/L_2)(Z_1-Z_2).$$

If $L_1=L_2$, then these relationships simplify even further to $$X_P=2X_1-X_2,$$

$$Y_P=2Y_1-Y_2,$$

and $$Z_P=2Z_1-Z_2.$$

Thus, if the three-dimensional coordinates of the two ranging radios 30 and 32 are determined, the three-dimensional coordinates of the point 23 is also known. The coordinates of ranging radios 30 and 32 are determined by use of the fixed position ranging radios 18, 20, 22 and 24, as described below.

The system further includes a measurement circuit 40 (FIG. 4) which is responsive to the pair of ranging radios 30 and 32. Circuit 40 determines the position of each of the ranging radios 30 and 32 with respect to the plurality of fixed position ranging radios 18, 20, 22, and 24 using trilateration analysis. The circuit 40 then determines the three-dimensional coordinates of the first end 12 and, more specifically, the three-dimensional coordinates of the point 23, with respect to the plurality of fixed position ranging radios 18, 20, 22, and 24. The measurement circuit 40 may receive the coordinates of the ranging radios 18, 20, 22, and 24 through a manual input at 42, or by any other appropriate means. Alternatively, these coordinates may be stored at the stationary control 49. In either event, the position of point 23 is determined in relation to the ranging radios 30 and 32 and compared with a desired point of operation in the database in stationary control 49, and information supplied to display 46. The operator display 46 is responsive to the measurement circuit 40. The components of FIG. 4 may be integral with the sensor 19, or may be packaged separately, and carried separately by the user of the system. Further, the ranging radios 30 and 32 are shown in FIG. 4 as being directly connected to the measurement circuit 40, but may alternatively be connected via a radio link, or other wireless link to the measurement circuit in the stationary control. The measurement circuit 40 is also responsive to the third ranging radio 33 so that it can determine the orientation of the tool 10 and make appropriate correction for the offset distance $L_3$ in the direction of the ranging radio 33.

In use, the fixed ranging radios 18, 20, 22, and 24 are positioned at the worksite, and their three-dimensional coordinates noted. As is known, to insure that ambiguities are eliminated, the fixed ranging radios are located so that they are not all in the same plane. The tool 10 is then moved by the operator so that the operating element of the tool is at a desired location, as indicated on display 46, the coordinates of which have been supplied to the circuit 40. The tool is then operated and the tool moved to the next point of operation. When the tool is properly positioned and operated, switch 48 may be actuated, permitting the system to keep track of the desired locations where the tool has been operated.

It will be appreciated that using four fixed position ranging radios at known positions, but not located in a common plane, permits point of interest locations throughout the work space to be determined unambiguously with trilateration calculations. It will also be appreciated that if only three fixed position ranging radios at known positions are used, the ambiguity which results is that the point of interest may be found at either of two possible locations. The two possible locations will be located, respectively, above and below a plane which is common to the three fixed position ranging radios. If one of the two possible locations can be eliminated in some manner, then the ambiguity is eliminated and only three fixed position ranging radios are required for operation of the system. As an example, the ambiguity might be eliminated by situating the three fixed position ranging radios on the floor of the first floor of an interior work site. If an assumption can be made that the point of interest will always be above the floor level, and therefore above the level of the common plane, then only one of the possible locations is possible. The possible three dimensional coordinate with the higher Z dimension coordinate will therefore be selected as the point of interest location.

If desired, a system may be configured to determine the coordinates of a point of interest in two dimensional space. Such a two dimensional system may be used, for example, to lay out positions for operation of tools on the floor of a building. Only two fixed position ranging radios need be used for two dimensional operation. As discussed, above, a system with three fixed position ranging radios will provide an ambiguous solution to the location calculation in that the point of interest could be at either of two positions, one position below the plane of the fixed position ranging radios, and the other position above the plane of the fixed position ranging radios. With only two fixed position ranging radios, the ambiguity is increased, with the position of interest being found to lie somewhere on a circle. The circle will be oriented such that it is a first uniform distance from a first of the radios and a second uniform distance from the second of the radios, with the first and second uniform distances being not necessarily equal. If the fixed position ranging radios are located on the floor of the work site, and if the point of interest is constrained to lie somewhere on the floor, then the ambiguity reduces to one of two possible points on the floor. Further, if the two ranging radios are placed on the floor at the side of the room such that one of the two points can be eliminated as being outside the room, then the ambiguities are eliminated, and a two dimensional layout on the floor of the work site can be accomplished.

Figure 5:
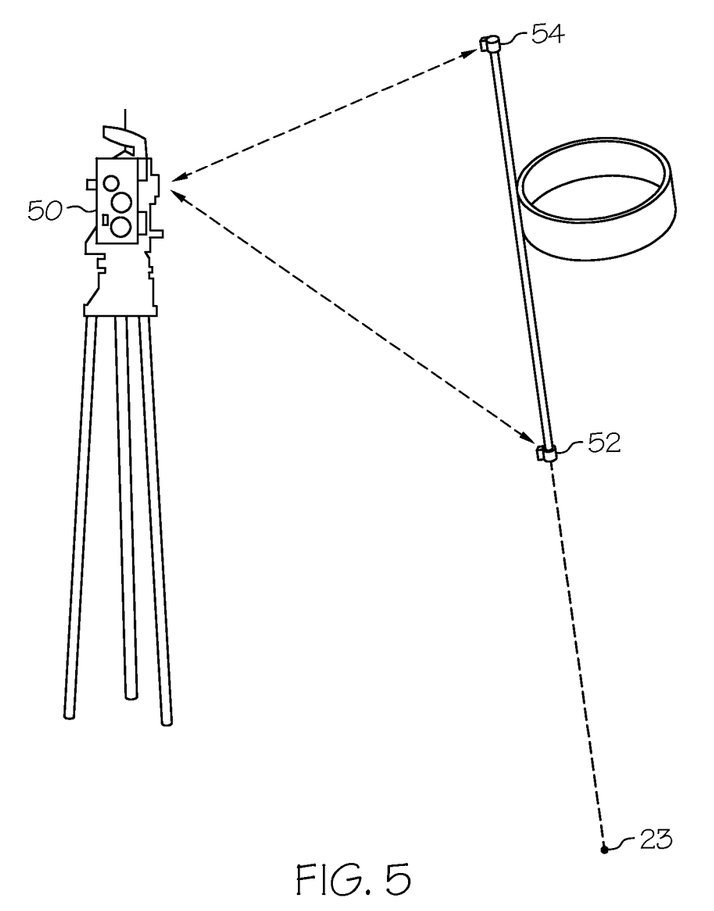
FIG. 5 shows a second embodiment of the system having retroreflective elements for use with a robotic total station.

FIG. 5 illustrates another embodiment which includes a device, such as a robotic total station 50, for measuring the positions of reference elements 52 and 54 on the power tool. The robotic total station is a device of the type available from Trimble Navigation Limited, which tracks one or more autoreflective elements and provides a continuous stream of data on the positions of such elements. The reference elements 52 and 54 in this embodiment consist of small bands of retroreflective tape that are in the same relative positions as described above with respect to the ranging radios 30 and 32. The robotic total station 50 repeatedly directs a thin beam of laser light to each of the reference elements 52 and 54, dithering between the elements. The total station receives the reflected light, and measures the time of flight of the beam. From this data, the measurement circuit 40 in the robotic total station 50 is able to calculate the three-dimensional coordinates of the elements 52 and 54, and the position of power tool operating element at 23 is therefore precisely specified. It will be appreciated that retroreflective cubes or other devices may be used instead of the tape strips 52 and 54. It will be understood that the position computation and display information in a robotic total station system will be addressed at the total station location in such a system and the display information then transmitted to the power tool for display.

Figure 6:
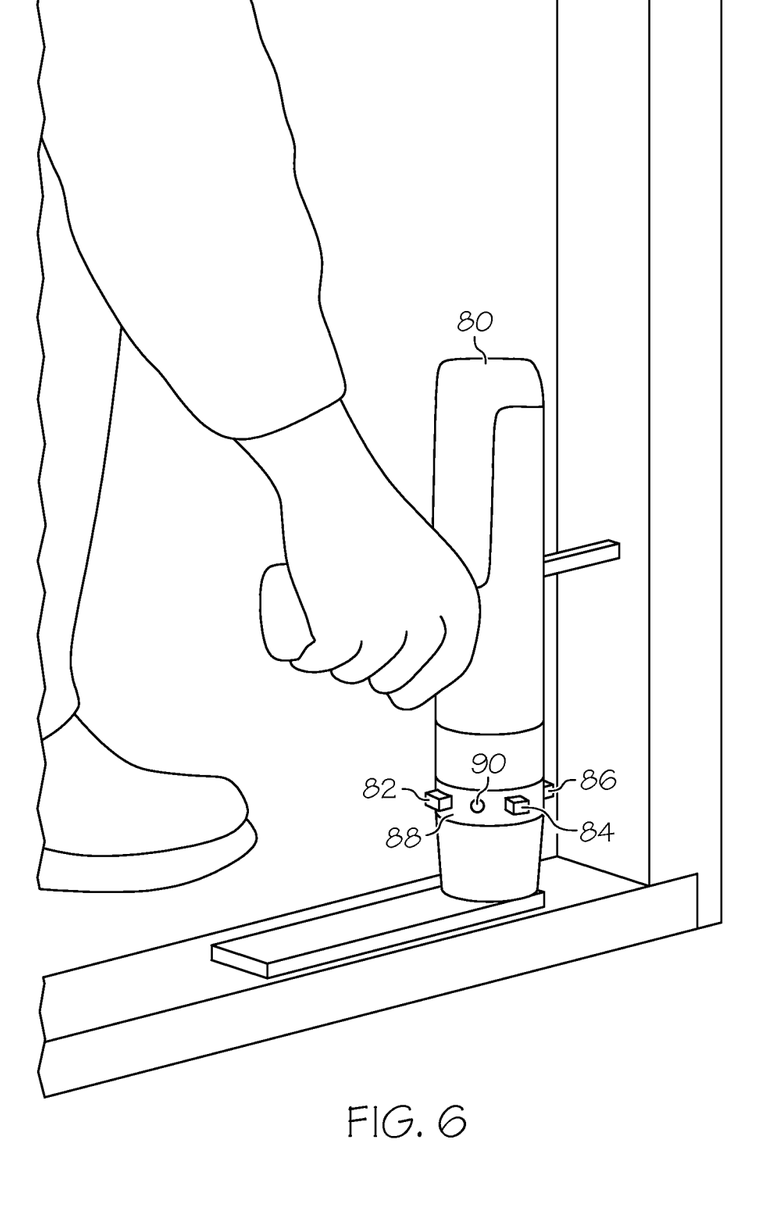
FIG. 6 shows a power tool with ranging radios mounted on the tool and an LED display.

Reference is made to FIG. 6 which shows a power tool 80 having a at least one reference element, shown as three ranging radios 82, 84 and 86, that are secured to a strap 88. The ranging radios are mounted on the power tool 80 in known spatial relation to the operating element of the tool 80. If desired, a fourth ranging radio (not shown) may be positioned on the strap 88 on the opposite side of the tool 80 from ranging radio 84. It will be appreciated that a determination of the positions of the ranging radios also is a determination of the orientation and location of the tool 80, including its operating element. The display in the embodiment of FIG. 6 is a simple LED 90 which illuminates when the tool 80 is properly positioned for actuation. If desired, the display could be a liquid crystal display, or other type of display, capable of displaying a greater amount of information.

Figure 7:
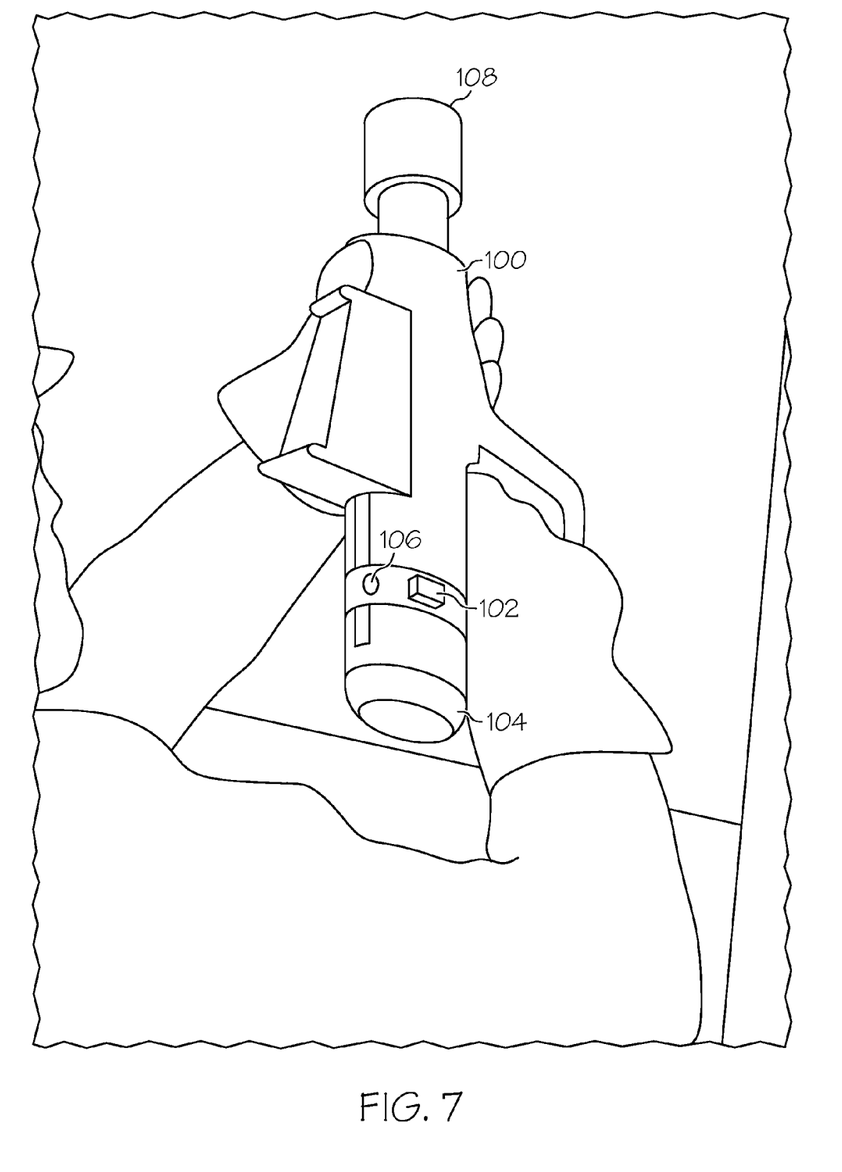
FIG. 7 shows a power tool with RFID circuits mounted on the tool and an LED display.

Reference is made to FIG. 7 which shows a power tool 100 with at least one reference element, in this case at least three RFID circuits 102, only one of which can be seen in the drawing. The RFID circuits are secured to a strap 104 which is mounted on the power tool 100, illustrated in FIG. 7 as a drill. The RFID circuits are mounted in predetermined spatial relation to the operating element, a cutting bit 108. If desired, four RFID circuits may be secured to the strap 102. It will be appreciated that a determination of the orientation of the position of the three or four RFID circuits by a central RFID detection system effectively determines the orientation and location of the tool 100 and its operating element 108. The display in the embodiment of FIG. 7 may be a simple LED 106 which illuminates when the tool 100 is properly positioned for operation.

Figure 8:
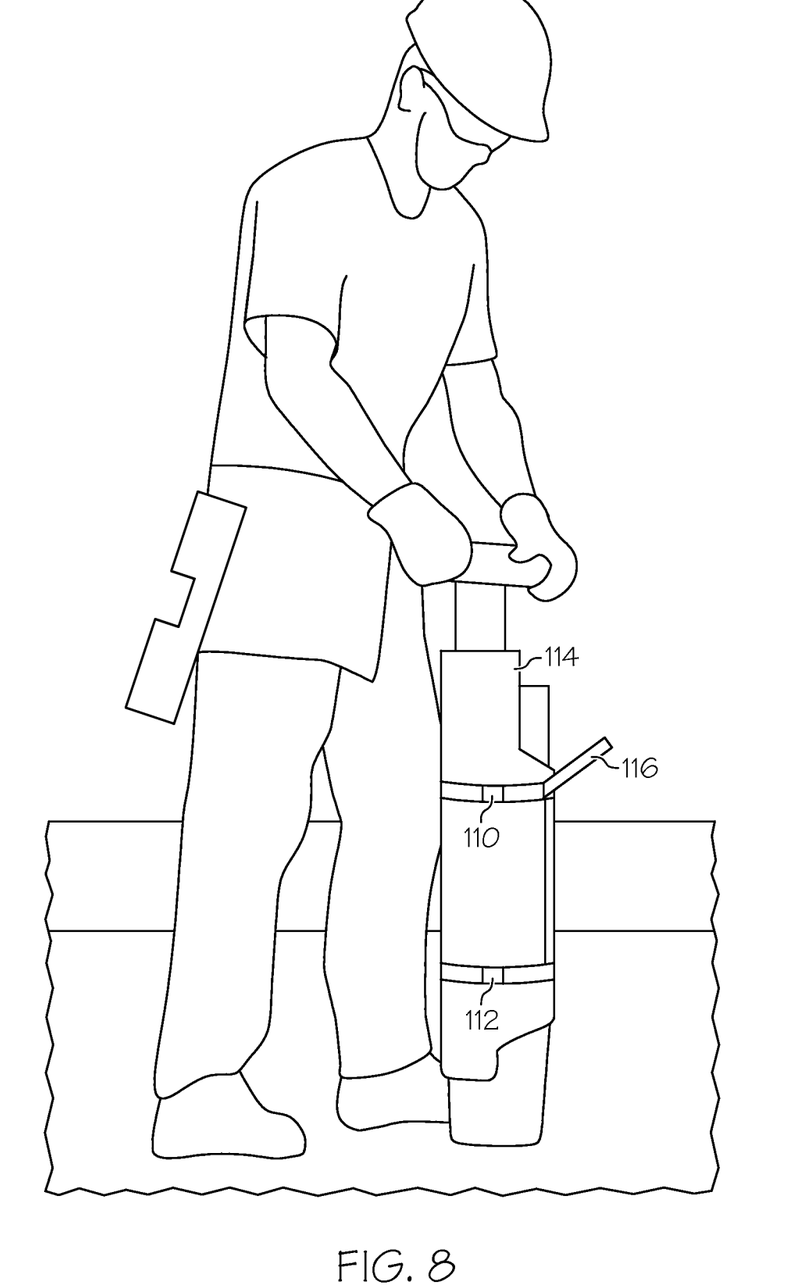
FIG. 8 shows a power tool with retroreflective elements and a display mounted on the tool.

Finally, FIG. 8 shows an embodiment that incorporates retroreflective cubes 110 and 112 that are strapped to a power tool 114 and that work in conjunction with a robotic total station to determine the location of the power tool 114. A display 116 provides an indication of the direction that the tool 114 should be moved to bring it to successive desired operating positions.

Other variations in the system depicted in FIGS. 1-8 may be adopted. For example, a video surveying system may be utilized for determining the position of a tool within the field of view of the surveying system and for signaling the location of the tool to the tool operator. The tool may carry unique video targets which allow the video surveying system to identify the location and orientation of the tool, and signal the operator with this information. The operator can then use the tool at predetermined locations throughout the worksite with the need for a lengthy, tedious layout of the worksite.

Other variations in the embodiments may be adopted. For example, the system may include a single sensor on the tool cooperating with the stationary control, provided there is additional instrumentation to indicate the orientation of the tool and therefore determine the position of the operating element of the tool. This additional instrumentation can take the form of inclinometers and the like on the tool.

Other arrangements can be used to determine the position and orientation of the tool. For example, a triangulation system of the type used for the determination of the location of cell phones may be used. Other variations in the system disclosed herein may also be made.

What is claimed is:

1. A system for assisting an operator of an operating element of a tool at desired locations at a worksite, comprising:
    a plurality of auto-reflective elements mounted on the tool,
    a stationary control, located at the worksite, having data stored therein specifying one or more desired locations for operation of the operating element of the tool at the worksite, said stationary control including
        a robotic total station for dithering among said auto-reflective elements,
        a measurement circuit, responsive to said auto-reflective elements, for determining relative position with respect to said stationary control, and
        a display for providing indications to the user of the tool of the desired location for the operating element of the tool and of the actual location of the operating element of the tool.

2. The system according to claim 1, in which said auto-reflective elements are mounted on said tool by a support band extending around said tool.

3. The system according to claim 1, in which said measurement circuit determines the position of the operating element of the tool and the movement of the operating element needed to move the operating unit to a desired location.

4. The system according to claim 1, in which said desired locations are specified in three dimensions.

5. The system according to claim 1, in which said desired locations are specified in two dimensions.

6. A system for determining dimensional coordinates of an operating element of a tool in a work space and indicating to a user of the tool that the operating element of the tool is properly positioned for operation, comprising:
    a tool having an operating element,
    a plurality of auto-reflective elements, mounted on said tool in known spatial relation to said operating element,
    a stationary control for measuring the positions of auto-reflective elements in the work space, said stationary control including a measurement device, responsive to said plurality of auto-reflective elements, for determining the position of said operating element of said tool in said work space, said measurement device comprising a robotic total station which dithers among said plurality of auto-reflective elements so as to determine the position of said operating element of said tool, and a display, mounted on said tool, for indicating that said operating element is properly positioned at a desired location for operation of said tool.

7. The system of claim 6, in which said display for indicating that said operating element is properly positioned for operation of said tool comprises a display, responsive to said measurement circuit, for indicating to a user the location of the operating element of said tool.

8. The system of claim 6, in which said display comprises a light which is turned on when said tool is positioned at a point for operation.

9. The system of claim 6, in which said measurement device is responsive to a user input to permit the user to specify a desired position for the operating element, and further comprising a display, responsive to said measurement device, for indicating the movement of the tool needed to move the operating element of the tool to said desired position.

10. The system of claim 6 in which said plurality of auto-reflective elements comprises a pair of auto-reflective elements mounted on said tool in known spatial relationship to said operating element, and in which said robotic total station dithers between said pair of auto-reflective elements so as to determine the position of said operating element of said tool.

11. The system according to claim 6, in which said plurality of auto-reflective elements are mounted on said tool by a support band extending around said tool.

12. The system according to claim 6, in which said desired location is specified in three dimensions.

13. The system according to claim 6, in which said tool is a power tool.

14. The system according to claim 6, in which said too is a handheld tool.

15. A method of assisting an operator of an operating element of a handheld tool at desired locations at a worksite, comprising the steps of:

providing a plurality of auto-reflective elements on a handheld tool for determining the location of the operating element of the handheld tool with respect to the worksite, determining the location of said auto-reflective elements by dithering among them with a robotic total station, identifying a location at the worksite at which the handheld tool is to be used, displaying an indication on the handheld tool that the operating element of the handheld tool is located at a desired location at the worksite, such that said handheld tool can be operated at the desired location.

16. The method of claim 15, in which said step of providing a plurality of auto-reflective elements includes the step of providing a pair of auto-reflective elements.

* * * * *

UNITED STATES PATENT AND TRADEMARK OFFICE
CERTIFICATE OF CORRECTION

PATENT NO. : 8,700,202 B2
APPLICATION NO. : 12/956536
DATED : April 15, 2014
INVENTOR(S) : Kent Kahle It is certified that error appears in the above-identified patent and that said Letters Patent is hereby corrected as shown below:

Claims
    Column 10, Claim 14, Line 8, Delete: "too"
                                    Insert --tool--

Signed and Sealed this
First Day of December, 2015

Michelle K. Lee
*Director of the United States Patent and Trademark Office*